(12) United States Patent
Ryu

(10) Patent No.: US 9,312,737 B2
(45) Date of Patent: Apr. 12, 2016

(54) MOTOR

(71) Applicant: LG INNOTEK CO., LTD., Seoul (KR)

(72) Inventor: Woongseon Ryu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 351 days.

(21) Appl. No.: 13/930,462

(22) Filed: Jun. 28, 2013

(65) Prior Publication Data

US 2014/0001896 A1 Jan. 2, 2014

(30) Foreign Application Priority Data

Jun. 28, 2012 (KR) .................. 10-2012-0069846

(51) Int. Cl.
*H02K 5/22* (2006.01)
*H02K 3/52* (2006.01)

(52) U.S. Cl.
CPC .............. *H02K 5/225* (2013.01); *H02K 3/522* (2013.01)

(58) Field of Classification Search
None
See application file for complete search history.

(56) References Cited

U.S. PATENT DOCUMENTS

| | | | |
|---|---|---|---|
| 6,600,244 B2* | 7/2003 | Okazaki et al. | 310/71 |
| 7,180,217 B2* | 2/2007 | Nakayama et al. | 310/179 |
| 2007/0273221 A1* | 11/2007 | Kinoshita et al. | 310/58 |
| 2010/0033044 A1* | 2/2010 | Isshiki et al. | 310/71 |
| 2012/0112582 A1* | 5/2012 | Kim | 310/71 |

FOREIGN PATENT DOCUMENTS

| | | |
|---|---|---|
| CN | 1122528 A | 5/1996 |
| CN | 1672308 A | 9/2005 |
| JP | 2000333418 A | 11/2000 |

OTHER PUBLICATIONS

Office Action dated Jul. 3, 2015 in Chinese Application No. 201310265576.6.

* cited by examiner

*Primary Examiner* — Tran Nguyen
(74) *Attorney, Agent, or Firm* — Saliwanchik, Lloyd & Eisenschenk

(57) ABSTRACT

Disclosed is a motor, the motor according to an exemplary embodiment of the present disclosure including a motor housing, a stator mounted inside the motor housing and including a stator core and a coil wound on the stator core, a rotor rotatably installed at a center of the stator, and a busbar provided with a plurality of circumferentially and straightly protruded busbar terminals mounted at an upper surface of the stator, and connected by a coil.

9 Claims, 9 Drawing Sheets

MOTOR

CROSS-REFERENCE TO RELATED APPLICATION

This application claims the benefit under 35 U.S.C. §119 of Korean Patent Application No. 10-2012-0069846, filed Jun. 28, 2012, which is hereby incorporated by reference in its entirety.

BACKGROUND

1. Field of the Disclosure

The present disclosure relates to a brushless motor.

2. Discussion of the Related Art

Generally, almost every vehicle employs an electric power-assist steering system. Such an electric power-assist steering system generates an assist force based on the steering torque and the steering angle in order to enhance the steering performance of the vehicle.

That is, a steering system that assists a steering force of a vehicle with a separate power is used to enhance the motion stability of a vehicle.

Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is configured such that an Electronic Control Unit (ECU) drives a motor in response to steering conditions detected by a speed sensor, a torque angle sensor and a torque sensor to enhance a steering stability and provide a quick restoring force, whereby a driver can safely steer a vehicle.

The EPS system is also such that a motor assists a torque manipulating a steering wheel to allow a driver to steer a vehicle with less power, where the motor employs a Brushless Direct Current (BLDC) motor.

The BLDC motors have been increasingly used because the brushless motors are excellent in maintenance property, have a small size, and are capable of generating a high torque.

The BLDC motor generally forms an exterior look by coupling of a housing with a cover member, an inner circumferential surface of the housing is provided with a stator, and the stator is centrally formed with a rotor rotatably mounted in electrical interaction with the stator. The rotor is rotatably supported by a rotation shaft, and an upper surface of the rotation shaft is connected by a steering shaft of a vehicle to provide a power assisting the steering of the vehicle as mentioned above. The stator of EPS motor thus configured serves to supply an electric power to a wound coil via busbar.

The stator includes a core and a coil wound on the core, and in general, a motor used for a vehicle is employed with a plurality of coils connected in parallel for loss reduction. Thus, the coil is extended to an input/output terminal, and integrated and connected at the terminal during parallel connection. In order to integrate and connect the coil arranged in parallel, a busbar is coupled to an upper surface of the stator, and in order to couple the busbar, a coil terminal of coils respectively wound on the upper surface of stator, and the busbar is connected to the coil terminal.

The busbar is fixedly arranged with a plurality of metal members electrically connected to the coil terminal which is then insulated by an insulator. The busbar takes an approximate shape of a doughnut to correspond to a shape of the stator. The busbar is arranged at a periphery with terminals for connecting the coil terminal.

The shape of a busbar is change in response to a connected electrical power, and in general, the EPS motor is configured such that respective input/output terminals are sequentially arranged to a periphery of the busbar through a 3-phase circuit.

However, there is a disadvantage in forming the busbar terminal bent to the busbar in that each busbar terminal must be bent at a predetermined size, and it is too much complicated to insert and fuse the coil into the busbar terminal, frequently generating faulty works.

Particularly, molds are complicated, and materials are wasted because of complicated shape of a fusing unit and generation of too much of scraps when the busbar terminal is manufactured using a press forming method, in a case the busbar terminal and the coil are fixed by being fused, and fusing unit is formed in a U-shape.

Another disadvantage is that a large quantity of straight portions of a coil for pulling the coil is required to resultantly waste a large quantity of coils, because the U-shaped ring type busbar terminal must be penetrated through a U-shaped ring, pulled, fused and cut.

BRIEF SUMMARY

The present disclosure is directed to cope with the above-mentioned problems/disadvantages and it is an object of the present disclosure to provide a structure-improved brushless motor configured to improve motor assembly.

In one general aspect of the present disclosure, there is provided a motor, the motor comprising: a motor housing; a stator mounted inside the motor housing and including a stator core and a coil wound on the stator core; a rotor rotatably installed at a center of the stator; and a busbar provided with a plurality of circumferentially and straightly protruded busbar terminals mounted at an upper surface of the stator, and connected by a coil.

Preferably, but not necessarily, the busbar may include a resin materialed busbar body, and a busbar terminal protruded to a circumferential direction of the busbar body.

Preferably, but not necessarily, a cross-section of the busbar terminal may take a shape of a rectangle.

Preferably, but not necessarily, the busbar terminal may be a hook groove having a width corresponding to a diameter of the coil.

Preferably, but not necessarily, the busbar terminal may include a through hole having a shape corresponding to that of a periphery of the coil, and a slit having a hitching unit having a width smaller value than that of a diameter of the through hole.

Preferably, but not necessarily, the slit may be formed with a bottleneck section formed by a width of a connection unit connected to the through hole smaller than a width of an opening connected to an outside of the busbar terminal.

Preferably, but not necessarily, the body may be formed with a resin material to be insert injection molded along with the busbar terminal.

Preferably, but not necessarily, the busbar terminal may be formed in one body with a circularly bent terminal body having a diameter corresponding to the body after press-work of a plate member, and the busbar terminal may be at least twice bent on the terminal body to allow a distal end to a circumferential direction of the body.

Preferably, but not necessarily, the busbar terminal may include a fusing unit formed with a conductive member at an area contacting the coil.

Preferably, but not necessarily, the busbar includes a first busbar body and a second busbar body, and the busbar terminal of the first busbar body has a first height and the busbar terminal of the second busbar body has a second height.

There is an advantageous effect in the motor according to an exemplary embodiment of the present disclosure in that a hook groove is formed at a busbar terminal to allow a coil to be directly hooked and coupled to a busbar terminal by bending the coil, whereby a manufacturing cost can be reduced by decreasing an amount of scraps generated in the course of manufacturing a busbar terminal, and a motor assembly can be improved by completion of connection process in which a stripper at a distal end of the coil is bent and fused by being coupled to a hook groove.

DETAILED DESCRIPTION

Now, a motor according to the exemplary embodiment of the present disclosure will be described in detail with reference to the accompanying drawings.

Figure 1:
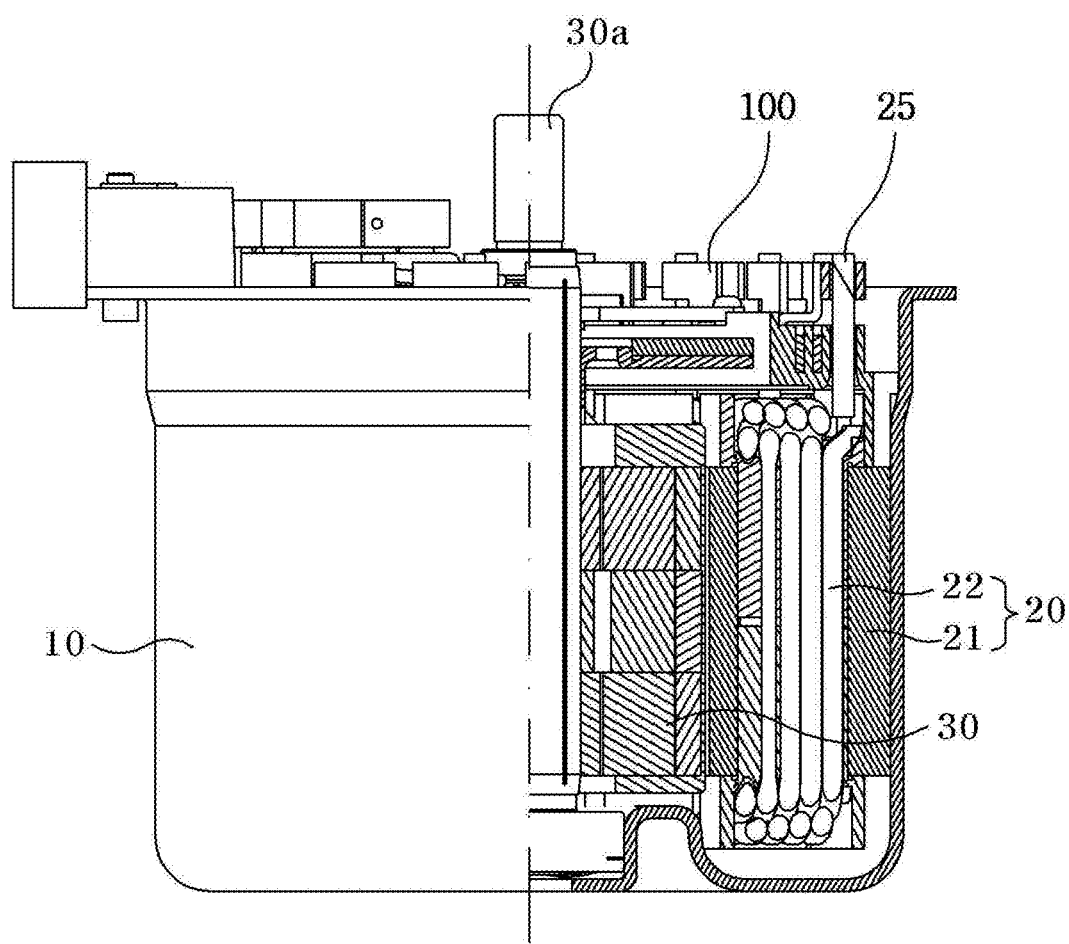
FIG. 1 is a partially cut-out cross-sectional view illustrating a motor according to an exemplary embodiment of the present disclosure.
Figure 2:
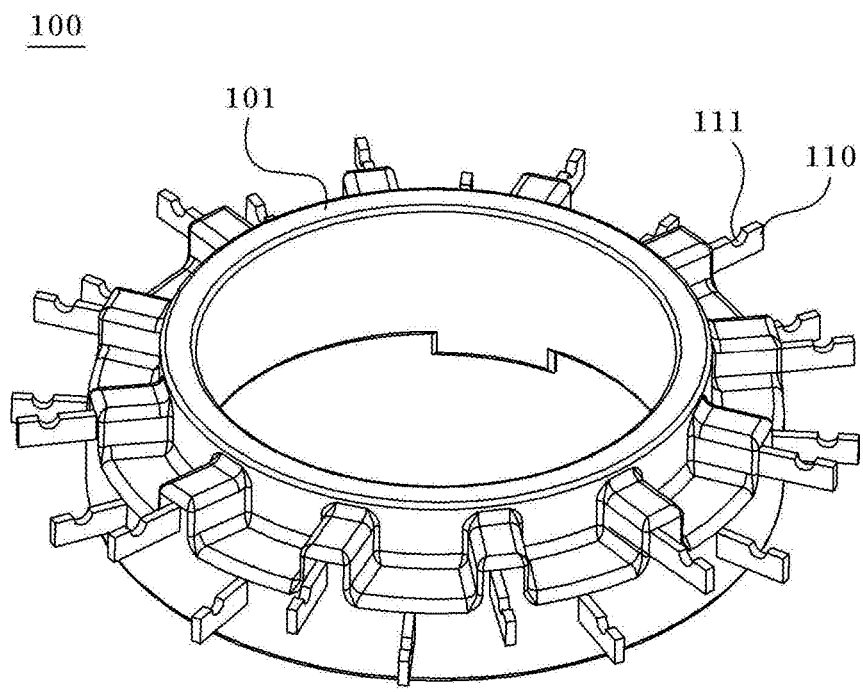
FIG. 2 is a perspective view illustrating a busbar according to an exemplary embodiment of the present disclosure.
Figure 3:
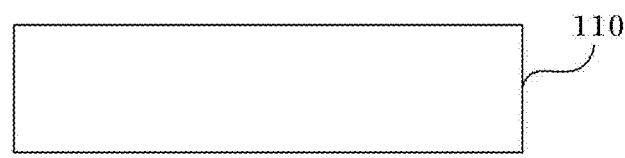
FIGS. 3 to 5 are schematic views view illustrating a shape of a busbar terminal according to first, second and third exemplary embodiments of the present disclosure.
Figure 4:
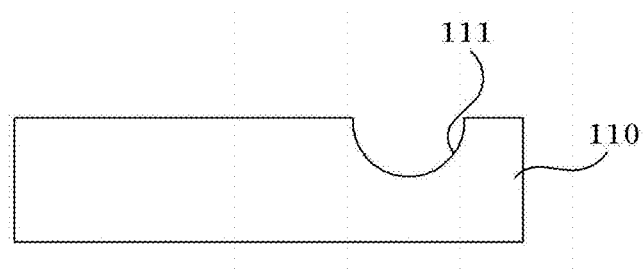
Figure 5:
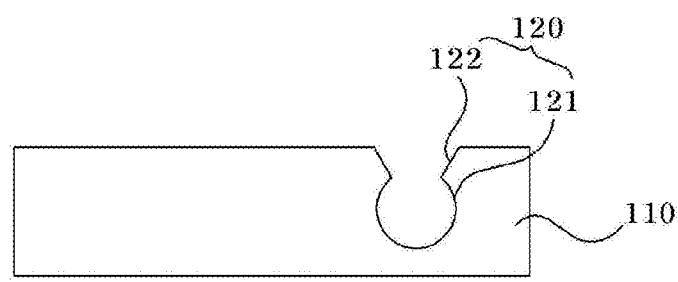
Figure 6:
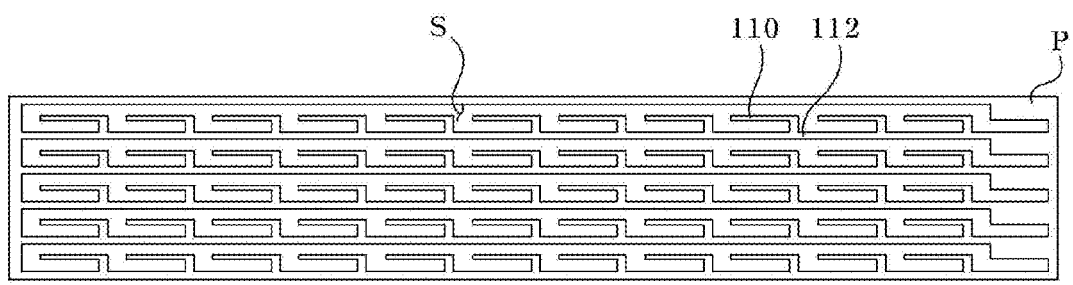
FIG. 6 is a schematic view illustrating a state in which a busbar terminal is formed by press-work of a plate.
Figure 7:
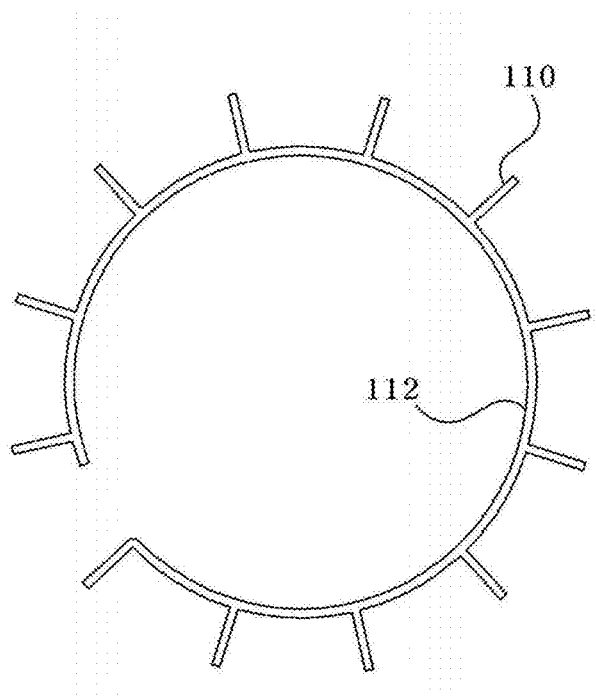
FIG. 7 is a schematic view illustrating a one-polarity busbar terminal formed by circularly bending a busbar terminal of FIG. 6.
Figure 8:
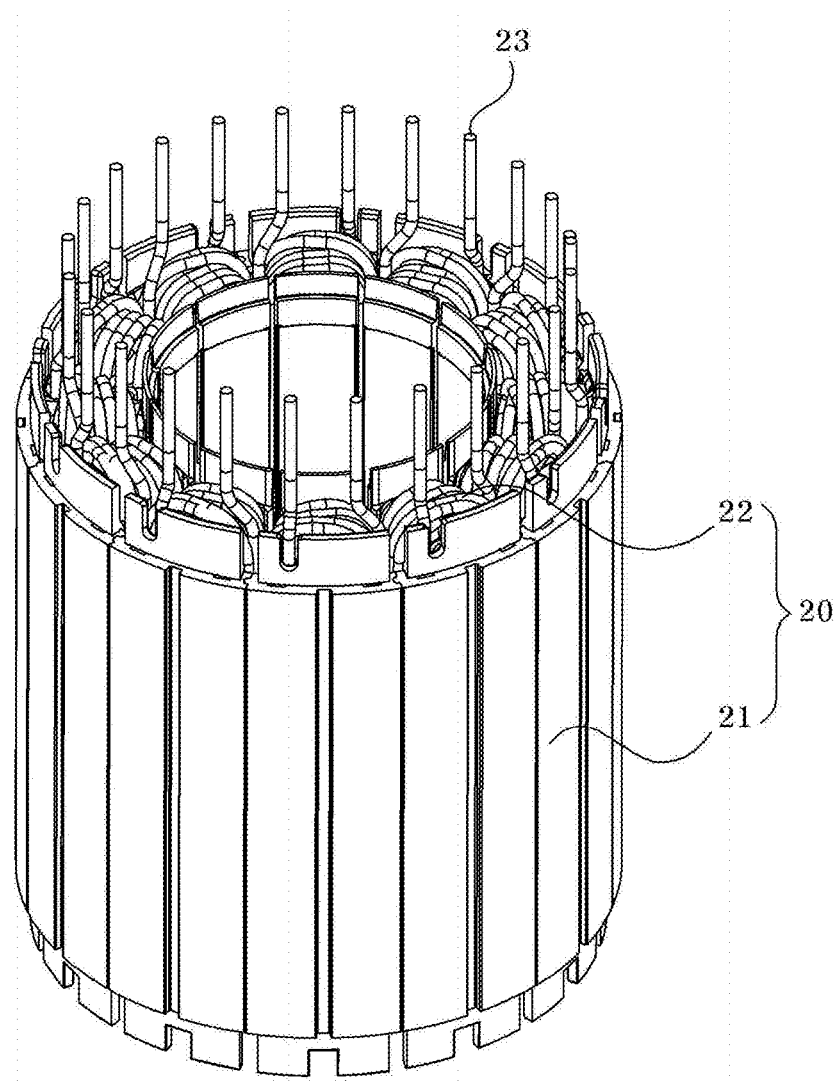
FIG. 8 is a perspective view illustrating a stator core wound with a coil.
Figure 9:
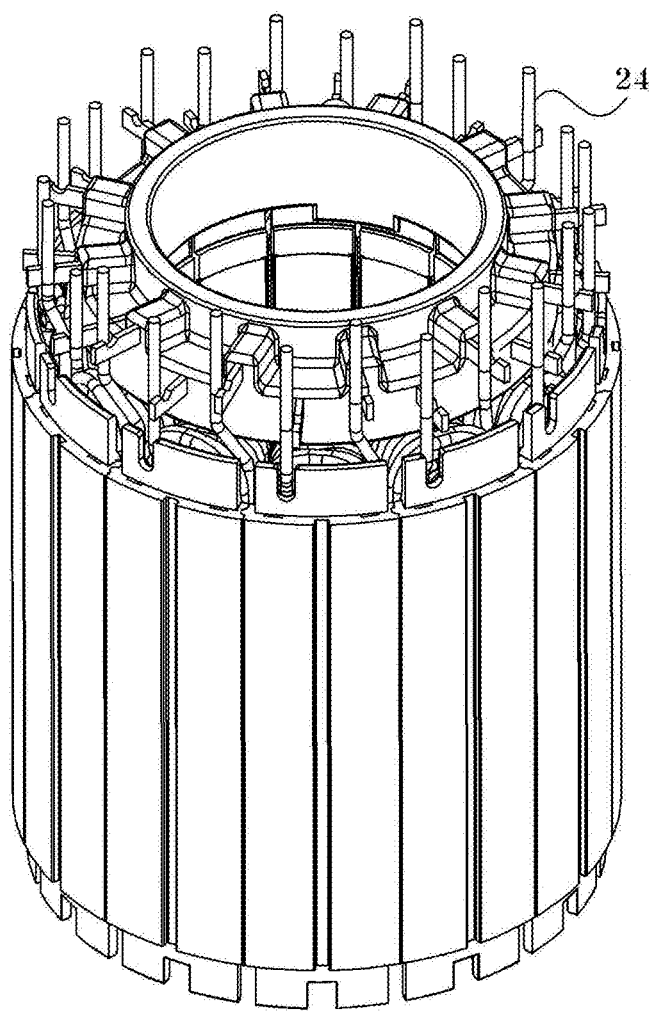
FIG. 9 is a perspective view illustrating a state in which a distal end of a coil wound on the stator core of FIG. 8 is stripped, and inserted with a busbar according to an exemplary embodiment of the present disclosure.
Figure 10:
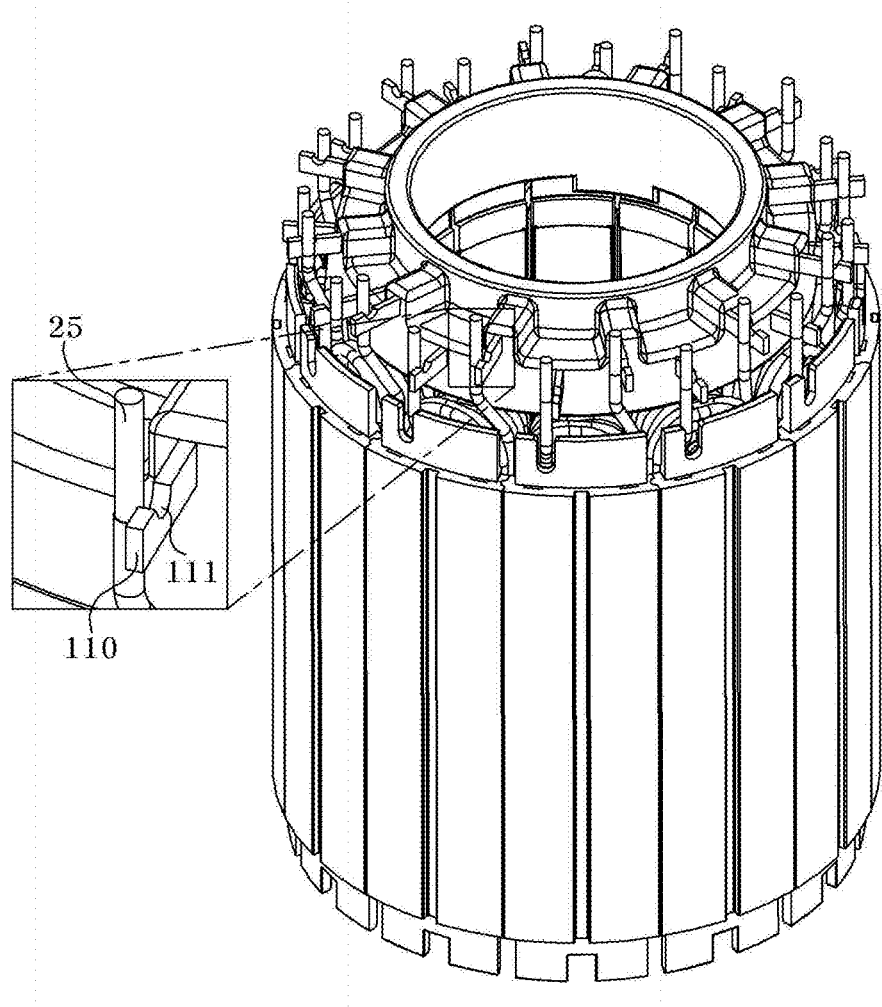
FIG. 10 is a perspective view illustrating a state in which a portion of a stripped coil protruded to an upper surface of the busbar of FIG. 9 is cut out according to the exemplary embodiment of the present disclosure.
Figure 11:
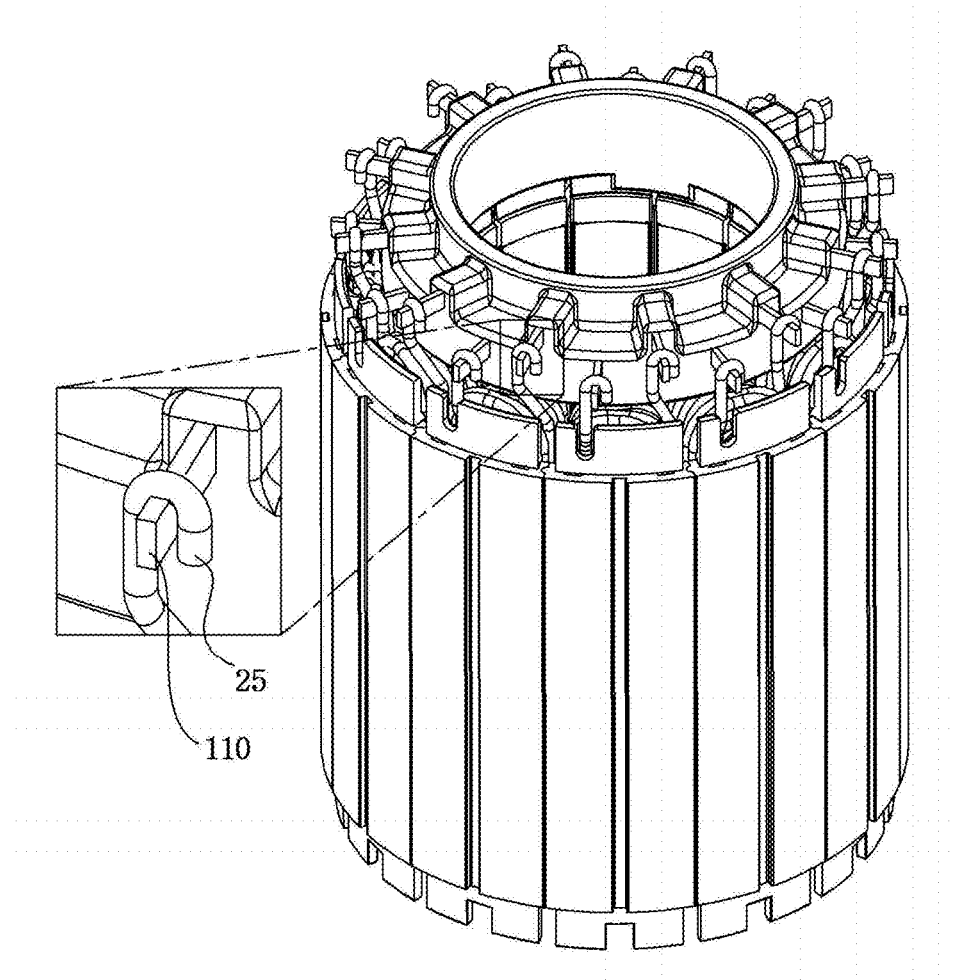
FIG. 11 is a perspective view illustrating a state in which the stripped portion of the coil in FIG. 10 is bent and hooked to a busbar terminal.
Figure 12:
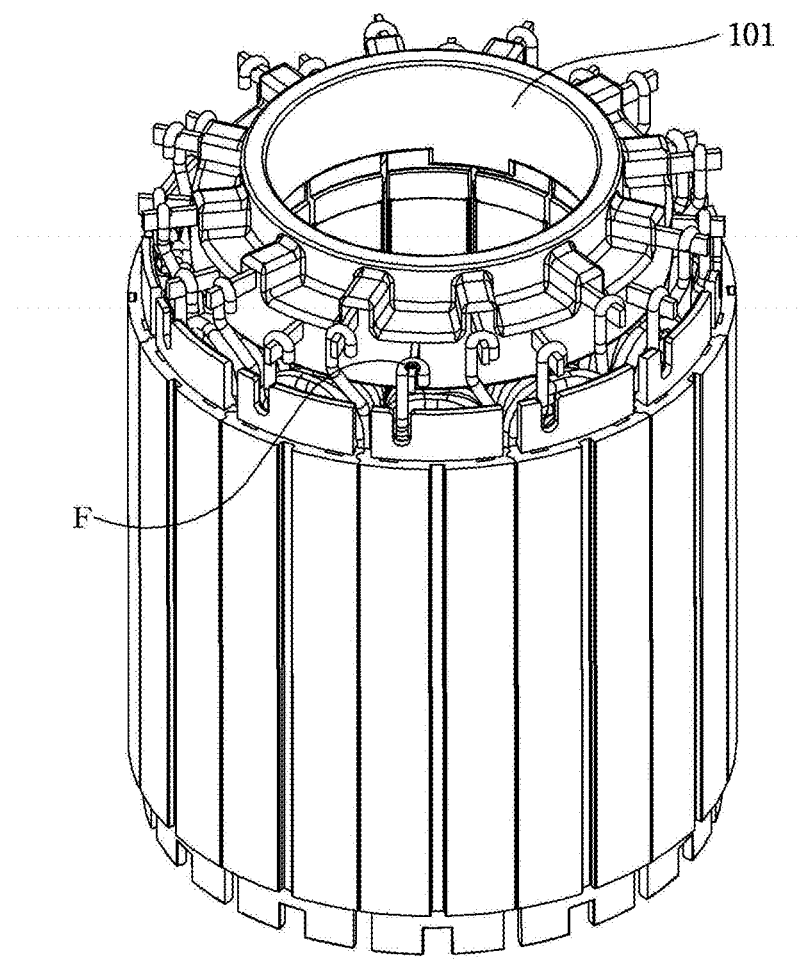
FIG. 12 a perspective view illustrating a state in which an upper surface of a plate module of FIG. 9 is soldered by a conductive member.

FIG. 1 is a partially cut-out cross-sectional view illustrating a motor according to an exemplary embodiment of the present disclosure, FIG. 2 is a perspective view illustrating a busbar according to an exemplary embodiment of the present disclosure, FIGS. 3 to 5 are schematic views view illustrating a shape of a busbar terminal according to first, second and third exemplary embodiments of the present disclosure, FIG. 6 is a schematic view illustrating a state in which a busbar terminal is formed by press-work of a plate, FIG. 7 is a schematic view illustrating a one-polarity busbar terminal formed by circularly bending a busbar terminal of FIG. 6, FIG. 8 is a perspective view illustrating a stator core wound with a coil, FIG. 9 is a perspective view illustrating a state in which a distal end of a coil wound on the stator core of FIG. 8 is stripped, and inserted with a busbar according to an exemplary embodiment of the present disclosure, FIG. 10 is a perspective view illustrating a state in which a portion of a stripped coil protruded to an upper surface of the busbar of FIG. 9 is cut out according to the exemplary embodiment of the present disclosure, FIG. 11 is a perspective view illustrating a state in which the stripped portion of the coil in FIG. 10 is bent and hooked to a busbar terminal and FIG. 12 a perspective view illustrating a state in which an upper surface of a plate module of FIG. 9 is soldered by a conductive member.

Referring to FIG. 1, an EPS motor according to an exemplary embodiment of the present disclosure includes a motor housing (10), a stator (20), and a rotor (30), and may further include a busbar (100) for supplying an electric power to a coil (22) wound on the stator (20).

The motor housing (10) takes an approximate shape of a cylinder, and is formed with at an upper surface with an opening and closed at a bottom surface. The motor housing (10) is installed therein with the stator (20), the rotor (30) and a rotation shaft (30a) rotatably supporting the rotor (30). The stator (20) includes a stator core (21), a coil (22) and a coil terminal (25) formed by stripping a distal end of the coil. The stator core (21) may be provided with a plurality of teeth, and the teeth may be circumferentially wound with the coil (22) while the teeth are mounted with an insulator. The distal end of the coil (22) is stripped to form the coil terminal (25), where the coil terminal (25) may be provided in a cylindrical shape having a predetermined length and a predetermined diameter.

The stator (20) may be assembled at an upper surface with the busbar (100) for supplying an electrical power to the coil (22). The busbar (100) may be formed with a plurality of busbar terminals (110) protruded toward a periphery of the body formed with a resin material as shown in FIG. 2. Characteristic of the present disclosure lies in a shape and a structure of the busbar (110), which will be described later.

The rotor (30) is rotatably mounted at a center of the stator (20), and is formed by a plurality of magnets being mounted at a periphery of rotor core. The rotation shaft (30a) is coaxially formed with the rotor (30), where one end of the rotation shaft (30a) is rotatably supported by a bottom bearing mounted at a floor surface of the motor housing (10), and the other end of the rotation shaft (30a) is supported by an upper bearing installed on a cover member (not shown).

Each of the busbars (100) according to an exemplary embodiment of the present disclosure functions to supply an electric power to the coil (22) wound on the stator core (21), and may include a ring-shaped body (101) having a diameter corresponding to the stator (20), and a plurality of busbar terminals (110) arranged along the periphery of the body (101) each spaced apart at a predetermined gap to supply an electric power having mutually different polarities to the coil (22). The busbar terminal (110) may be provided with a conductive material and may be generally formed with a metal material easy for press work.

According to a first exemplary embodiment of the present disclosure, the busbar terminal (110) may be formed with a groove-less square plate member as shown in FIG. 3. In this case, the coil (22) may be bent and wound toward an upper side of the busbar terminal (110) and connected by being fused with a contact portion of the coil terminal (25) formed at a distal end of the coil (22).

According to a second exemplary embodiment of the present disclosure, the busbar terminal (110) may be formed with a hook groove (111) having a shape corresponding to the coil (22) as illustrated in FIG. 4, where the coil terminal (25) formed at the distal end of the coil (22) may be accommodated into the hook groove (111), and the busbar terminal (110) may be connected by fusing a contact portion between an inner surface of the hook groove (111) the coil terminal (25).

According to a third exemplary embodiment of the present disclosure, the busbar terminal (110) may be provided with a through hole (121) having a shape corresponding to that of the periphery of the coil as illustrated in FIG. 5, and with a slit (122) forming a hitching unit having a width of a value smaller than a diameter of the through hole (121). In this case, the coil terminal (25) formed at a distal end of the coil may be pushed in through the slit (122) for accommodation into the through hole (121), and the coil terminal (25) may be conductively connected to the busbar terminal (110) by fusing the slit portion.

Referring to FIG. 6, the busbar terminal (110) may be configured such that the busbar terminal (110) and a terminal body (112) are formed on one sheet of plate member (P) to remove a space (S) and fold in a circular manner as shown in FIG. 7.

According to the abovementioned configuration, a quantity of scraps cut to the space (S) can be minimized to reduce material that is to be wasted, and folded at the terminal body (112) twice to form the busbar terminal (110), whereby process can be simplified.

Furthermore, as illustrated in FIG. 2, the busbar terminal (110) thus configured may be protrusively formed on first and second ring-shaped bodies (101). The busbar terminal (110) of the first ring-shaped body (101) has a first height, and the busbar terminal (110) of the second ring-shaped body (101) has a second height. This is to minimize interference between coils (22) hooked on adjacent busbar terminals (110).

Now, a coupling method of the busbar (100) according to the present disclosure will be described with reference to FIGS. 8 to 12. The present disclosure relates to a brushless motor using a 3-phase (U, V, W) electric power, and a general structure of the stator (20) is the same as that explained in FIG. 1.

Referring to FIG. 8, a distal end (23) of the coil (22) wound on the stator core (21) may be arranged in a state of being lengthily stood at an upper surface of the stator core while being wrapped in an insulated coating wrapping the coil (22). At this time, the distal end (23) of the coil may be arranged at an erect state to a direction parallel with a lengthwise direction of the stator core (21), and the distal end (23) of the coil may be arranged near to the busbar terminal (110) protrusively formed to a periphery of the busbar (100).

Referring to FIG. 8, the busbar (100) is installed as shown in FIG. 9, while a coating-stripped distal end (23) of the coil (22) is erected, a strip portion (24) protruded to an upper surface of the busbar (100) is removed as shown in FIG. 10 to form the coil terminal (25) with an appropriate length, and a portion of the coil terminal (25) may be formed at a position near to the busbar terminal (110) as illustrated in FIG. 10.

Furthermore, as illustrated in FIG. 11, the coil terminal (25) is bent in a U shape to be accommodated into the hook groove (111) formed on the busbar terminal (110). The coil terminal (25) accommodated into the hook groove (111) may be soldered using a conductive material such as a lead, whereby assembly can be finished.

As apparent from the foregoing, the motor according to exemplary embodiments of the present disclosure has an advantageous effect in that a busbar (100) excellent in connectivity with the coil (22) over the conventional busbar can be manufactured, and particularly, the amount of scraps generated in the course of manufacturing the busbar terminal (110) can be minimized.

Another advantageous effect is that, in a case the hook groove (111) is formed at the busbar terminal (110), the coil terminal (25) can be arranged at an accurate position to reduce defects during manufacturing such as the coil terminal (25) being disengaged from or erroneously connected with the busbar terminal (110) during fusing process.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A motor, the motor comprising:
a motor housing;
a stator mounted inside the motor housing and including a stator core and a coil wound on the stator core;
a rotor rotatably installed at a center of the stator;
a busbar disposed at an upper side of the stator and including a plurality of circumferentially and straightly protruded busbar terminals; and
a hook groove formed on each of the busbar terminals and accommodating at least a portion of the coil,
wherein the hook groove is downwardly recessed from an upper surface of each of the plurality of busbar terminals.

2. The motor of claim 1, wherein the busbar includes a busbar body formed with resin, and each of the busbar terminals is protruded from the busbar body in a circumferential direction.

3. The motor of claim 2, wherein a cross-section of each of the busbar terminals takes a shape of a rectangle.

4. A motor, the motor comprising:
a motor housing;
a stator mounted inside the motor housing and including a stator core and a coil wound on the stator core;
a rotor rotatably installed at a center of the stator;
a busbar disposed at an upper side of the stator and including a plurality of circumferentially and straightly protruded busbar terminals;
a hook groove formed on each of the busbar terminals and accommodating at least a portion of the coil,
wherein the hook groove is downwardly recessed from an upper surface of each of the busbar terminals;
a through hole formed on each of the busbar terminals and having a shape corresponding to that of a periphery of the coil, and
a slit disposed between the through hole and a side end of each of the busbar terminals,
wherein the coil is inserted into the through hole through the slit from the side end of each of the busbar terminals, and
wherein a width of the slit decreases from the side end of each of the busbar terminals to the through hole, and a width of at least a portion of the slit is smaller than that of a diameter of the through hole.

5. The motor of claim 4, wherein the slit is formed with a bottleneck section connected to the through hole and the side end of each of the busbar terminals.

6. The motor of claim 2, wherein a body of the busbar is formed with a resin material to be insert injection molded along with the busbar terminals.

7. The motor of claim 2, wherein each of the busbar terminals is formed in one body with a circularly bent terminal body having a diameter corresponding to that of the body after press-work of a plate member, and each of the busbar terminals is at least twice bent on the terminal body to allow a distal end extending in a circumferential direction of the body.

8. The motor of claim 2, wherein each of the busbar terminals includes a fusing unit formed with a conductive member at an area contacting the coil.

9. The motor of claim 2, wherein the busbar includes a first busbar body and a second busbar body, and the busbar terminals of the first busbar body has a first height and the busbar terminals of the second busbar body has a second height.

* * * * *